(12) United States Patent
Matthews

(10) Patent No.: US 8,217,326 B1
(45) Date of Patent: Jul. 10, 2012

(54) METHOD OF CALIBRATING EARTH, LUNAR AND SOLAR SPECTROMETERS

(75) Inventor: Grant Matthews, Fort Wayne, IN (US)

(73) Assignee: Exelis, Inc., McLean, VA (US)

( * ) Notice: Subject to any disclaimer, the term of this patent is extended or adjusted under 35 U.S.C. 154(b) by 158 days.

(21) Appl. No.: 12/853,658

(22) Filed: Aug. 10, 2010

Related U.S. Application Data

(63) Continuation-in-part of application No. 12/542,885, filed on Aug. 18, 2009.

(51) Int. Cl.
*G01J 1/20* (2006.01)
(52) U.S. Cl. ............... 250/203.1; 356/121; 359/399
(58) Field of Classification Search ........... 250/203.1; 359/399–431; 356/121–127
See application file for complete search history.

(56) References Cited

U.S. PATENT DOCUMENTS

| 3,519,823 | A | * | 7/1970 | Snyder et al. .............. 250/347 |
| 5,218,416 | A | | 6/1993 | Haring et al. |
| 5,659,168 | A | * | 8/1997 | Dey et al. .................. 250/208.1 |
| 5,672,866 | A | * | 9/1997 | Messina .................... 250/252.1 |
| 6,111,640 | A | | 8/2000 | Hedman et al. |
| 6,278,100 | B1 | * | 8/2001 | Friedman et al. .......... 250/201.9 |
| 6,455,830 | B1 | * | 9/2002 | Whalen et al. ............ 250/203.1 |
| 7,166,825 | B1 | * | 1/2007 | Smith et al. ............... 250/203.4 |
| 7,321,654 | B2 | * | 1/2008 | Cho et al. .................. 378/158 |
| 7,482,572 | B1 | * | 1/2009 | Galvin ...................... 250/216 |
| 8,067,738 | B1 | * | 11/2011 | Heath et al. ............... 250/338.1 |

OTHER PUBLICATIONS

Matthews, Grant, Celestial Body Irradiance Determination From an Underfilled Satellite Radiometer: Application to Albedo and Thermal Emission Measurements of the Moon Using Ceres, Applied Optics; vol. 47, No. 27, Sep. 20, 2008.
Matthews, Grant, "In-Flight Spectral Characterization and Calibration Stability Estimates for the Clouds and the Earth's Radiant Energy System (Ceres)", Journal of Atmospheric and Oceanic Technology, vol. 26, Sep. 2009.

* cited by examiner

*Primary Examiner* — Seung C Sohn
(74) *Attorney, Agent, or Firm* — RatnerPrestia

(57) ABSTRACT

A method for calibrating a spectrometer, while orbiting a celestial body, includes the steps of: (a) obtaining an estimate of radiance emanating from the celestial body; (b) raster scanning the celestial body using the spectrometer; (c) measuring filtered radiance of the celestial body based on step (b); and (d) determining gain of the spectrometer using steps (a) and (c). A calibrated spectrometer of the present invention is based on the determined gain of step (d). The method includes the step of: (e) raster scanning another celestial body to determine the albedo radiance of the other celestial body, after determining gain of the spectrometer in step (d). The celestial body may be the moon and the other celestial body may be the Earth.

16 Claims, 5 Drawing Sheets

AZIMUTH ROTATION AT
FIXED ELEVATION

METHOD OF CALIBRATING EARTH, LUNAR AND SOLAR SPECTROMETERS

CROSS REFERENCE TO RELATED APPLICATIONS

This application is a continuation-in-part of U.S. Nonprovisional application Ser. No. 12/542,885, filed on Aug. 18, 2009, by Dr. Grant Matthews, the contents of which are incorporated herein by reference.

TECHNICAL FIELD

The present invention relates, in general, to the field of radiometry and, more specifically, to systems and methods for radiometric calibration of climate monitoring remote sensors in space.

BACKGROUND OF THE INVENTION

Space based planetary imagers are useful for remote sensing of atmospheric compositions, crop assessments, weather prediction and other types of monitoring activities. Monochromatic and multispectral satellite-based, remote sensors are able to measure properties of the atmosphere above the earth, when their detector arrays are properly calibrated for radiometric response.

A method of calibrating the radiance measured by these remote sensors is to create a reference radiation using a known source of spectral radiance, such as the sun. The radiation from the sun may be used as a reference signal into a diffusive reflector which, in turn, may provide a known radiance to a remote sensor for calibrating its one or more detector arrays.

The output of a detector array may be measured as the remote sensor receives the known reflected energy from the diffusive reflector. This radiance calibration method provides sufficient information to correctly measure and calculate other types of radiance incident on the remote sensor during normal operation, such as radiance from views of the Earth or other targets of interest. The spectral characteristics of a diffusive reflector, or diffuser panel, however, may change with time due to degradation of the diffuser panel. Since the diffuser panel is employed as the reference source, any change, i.e., degradation in the diffusive surface material, results in distortion in the measurements of the remote sensor.

Techniques have been suggested for calibrating Earth viewing spectrometers. One technique suggests viewing the sun directly to calibrate an Earth viewing spectrometer. Viewing the sun directly, however, requires using precision attenuators. Such attenuators may include a 500 micron pinhole, a 0.1 throughput neutral density filter and a CCD array, in which the latter is sub-sampled in time by a factor of 10. Using these attenuators results in the necessary attenuation of 1/100,000, and allows the sun to be used as a calibration source.

The aforementioned solar attenuation technique has been proposed for calibrating an Earth viewing solar wavelength spectrometer, such as the Climate Absolute Radiance and Refractivity Observatory (CLARREO), which is intended for monitoring the albedo from the Earth over a long time duration. In order to accomplish its mission, CLARREO must have an absolute accuracy of 0.3% and a calibration stability of 0.1% per decade.

Proposing the solar attenuation technique to calibrate CLARREO, however, raises several concerns. These concerns include lack of precise knowledge and stability of the proposed 500 micron pinhole. There is also concern about the performance of the primary mirror in CLARREO for viewing the Earth. This concern is due to potential burn in the mirror, or degradation of spots on the mirror, thereby causing changes in the response characteristics of the mirror. Furthermore, although throughput of the proposed neutral density filter is to be measured regularly by viewing the moon (i.e. with the filter in and out of the optical train), nevertheless, the lunar albedo is currently known to a low accuracy value of approximately 5-10%. This value may also change by several percent in a matter of minutes as the moon orbits the Earth. Finally, the time sub-sampling of the CCD array raises concerns over its accuracy and linearity.

The U.S. Geological Service (USGS) has a Robotic Lunar Observatory (ROLO), which has made daily measurements of the solar spectral irradiance scattered from the moon in the Arizona desert. These measurements allowed construction of a database model of ROLO that provides a spectrally resolved albedo of the moon for all phase/libration angles.

As it is based on measurements made from Earth, the ROLO model has to account for the absorption of the atmosphere above Arizona. For this reason, the ROLO model has excellent stability over time, but its absolute accuracy is estimated to be at a 5-10% level, which is not sufficient to meet the CLARREO goal of 0.3% absolute accuracy.

The present invention addresses this problem, and provides a method and system for calibrating a climate monitoring remote sensor, such as CLARREO, which requires a spectrometer with a 0.3% absolute accuracy and a 0.1% per decade calibration stability.

As will be explained, the present invention provides a raster scan integral method to raster scan the moon using spectrometers of existing technology. These spectrometers are calibrated by the present invention and then used for determining the albedo of the Earth, at an initial 5-10% accuracy and a 0.1% per decade calibration stability. The 5-10% accuracy is too low to satisfy requirements, however, because the calibration also relies on the database model of ROLO, which has the low accuracy of 5-10%.

Later in time, similar spectrometers may be installed on the International Space Station (ISS), along with a standardized, traceable measurement bench. These later spectrometers also use the raster scan integral of the present invention to separately raster scan the moon and the sun. Using the measurement bench, these later spectrometers may be calibrated to an accuracy of 0.3%, which satisfies requirements.

Furthermore, the present invention allows for the updating of the previous, low accuracy albedo data of the Earth that have been obtained from the earlier spectrometers, which relied on the database model of ROLO for their calibration. Once updated, the albedo data of the Earth obtained from the earlier spectrometers will be corrected to the required absolute accuracy. Thus, the present invention is effective in obtaining the albedo of the Earth over a long time duration, at the required 0.3% accuracy and 0.1% per decade stability.

SUMMARY OF THE INVENTION

To meet this and other needs, and in view of its purposes, the present invention provides a method for calibrating a spectrometer, while orbiting a celestial body. The method includes the steps of (a) obtaining an estimate of radiance emanating from the celestial body; (b) raster scanning the celestial body using the spectrometer; (c) measuring filtered radiance of the celestial body based on step (b); and (d)

determining gain of the spectrometer using steps (a) and (c). A calibrated spectrometer is based on the determined gain of step (d).

The method also includes the step of: (e) raster scanning another celestial body to determine the albedo radiance of the other celestial body, after determining gain of the spectrometer in step (d). The celestial body may be the moon and the other celestial body may be the Earth.

Obtaining the estimate of radiance in step (a) results from an Earth based spectrometer used for estimating the radiance emanating from the celestial body.

Measuring the filtered radiance of the celestial body in step (c) is based on the following equation:

$$F_k = \int_0^{2\pi} \left[ \frac{V_k(\theta(t), \phi(t))}{\Delta\Omega(t)\cos\theta(t)} \right] d\Omega$$

where $$\Delta\Omega(t) = 2\pi \left( 1 - \sqrt{1 - \frac{R_{eq}R_{pol}}{D_{sb}^2(t)}} \right) \text{ and}$$

$V_K$ is the signal from detector k, at wavelength $\lambda_k$, which varies in time, as a function of elevation and azimuth angles to the celestial body with respect to the satellite, $R_{eq}$ and $R_{pol}$ is the equatorial and polar radii of the celestial body, respectively, and $D_{sb}(t)$ is the distance between the satellite and the celestial body.

Determining gain of the spectrometer in step (d) is based on the following equation:

$$G_k^{Ed1} = \frac{F_k}{L_k^{BODY}}$$

where $G_k^{Ed1}$ is an Edition 1 release of the gain of the spectrometer, at wavelength $\lambda_k$, and $L_k^{BODY}$ is a known radiance of the celestial body, as determined by another spectrometer.

The method may also include the step of: (e) raster scanning the Earth to determine the albedo radiance of the Earth, after determining gain of the spectrometer in step (d); and determining the albedo radiance of the Earth includes the following equation:

$$A_k^{Ed1} = \frac{V_k}{G_k^{Ed1}}$$

where $V_k$ is a signal obtained from detector k of the spectrometer, while operating at wavelength $\lambda_k$, on a scene of the Earth, $G_K^{Ed1}$ is the Edition 1 release of the gain of the spectrometer, at wavelength $\lambda_k$, and $A_k^{Ed1}$ is the Edition 1 albedo radiance of the Earth.

The method may also include the steps of: (f) obtaining an improved estimate of radiance emanating from the celestial body; (g) determining an improved gain of the spectrometer, using the improved estimate in step (f) and the measured filtered radiance in step (c); and (h) determining an improved albedo radiance of the Earth based on the following equation:

$$A_k^{Ed2} = \frac{V_k}{G_k^{Ed2}}$$

where $V_k$ is the same signal obtained in step (e), $G_k^{Ed2}$ is an improved Edition 2 release of the gain of the spectrometer, at wavelength $\lambda_k$, and $A_k^{Ed2}$ is a re-computed Edition 2 albedo radiance of the Earth at an improved accuracy.

Another embodiment of the present invention is a second method of determining albedo radiance of the Earth. The second method includes the steps of: (a) obtaining an estimate of radiance emanating from the moon using an Earth-based spectrometer; (b) raster scanning the moon using an orbiting spectrometer; (c) measuring filtered radiance of the moon based on step (b); (d) determining gain of the orbiting spectrometer using steps (a) and (c); and (e) estimating the albedo radiance of the Earth using the orbiting spectrometer and the gain determined in step (d).

Step (a) of the second method includes using the Earth-based spectrometer having an absolute accuracy of approximately 5%.

Step (d) of the second method includes determining the gain of the orbiting spectrometer to an absolute accuracy of approximately 5%.

Step (e) of the second method includes estimating the albedo radiance of the Earth to an absolute accuracy of approximately 5%.

The second method includes the steps of: (f) installing another orbiting spectrometer in space to raster scan the moon; (g) installing an integrating sphere in space to determine gain of the other orbiting spectrometer; (h) updating the gain of the Earth-based spectrometer by raster scanning the moon using the other orbiting spectrometer; and (i) re-estimating the albedo radiance of the Earth initially estimated in step (e).

Step (h) of the second method includes updating the gain of the Earth-based spectrometer to an absolute accuracy of at least 0.3%. Step (i) of the second method includes re-estimating the albedo radiance of the Earth to an absolute accuracy of at least 0.3%.

Installing another orbiting spectrometer and an integrating sphere in space includes installing both on the International Space Station (ISS).

Yet another embodiment of the present invention is a method of improving accuracy of measured albedo radiance of the Earth. The method includes the steps of: (a) launching a first spectrometer to raster scan the moon; (b) using a convolution integral to determine the lunar albedo, and determining gain of the first spectrometer to a low accuracy; (c) measuring the albedo radiance of the Earth to a low accuracy using the first spectrometer; (d) launching a second spectrometer and an integrating sphere; (e) using the integrating sphere to determine gain of the second spectrometer to a high accuracy; (f) raster scanning the moon to determine the lunar albedo and re-calculating gain of the first spectrometer to a high accuracy; and (g) updating the measured albedo radiance of the Earth in step (c) to the high accuracy.

It is understood that the forgoing general description and the following detailed description are exemplary, but are not restrictive of the invention.

BRIEF DESCRIPTION OF THE DRAWINGS

The present invention may be understood from the following description when read in connection with the accompanying figures:

FIG. 1b is a functional view of the azimuth and elevation angles provided of a lunar raster scan by the CERES instrument shown in FIG. 1a.

DETAILED DESCRIPTION OF THE INVENTION

In U.S. patent application Ser. No. 12/542,885, filed by the inventor of the present application, a description of the Clouds and the Earth's Radiant Energy System (CERES) is provided. As described therein, CERES is a satellite which includes instruments (radiometers) for monitoring global Earth radiation budget (ERB) parameters from space. The CERES radiometers also view the moon. The CERES field-of-view (FOV), however, is approximately ten times larger than the extent of the lunar disk seen from a low earth orbit. In addition, each CERES detector in the radiometers has a non-uniform spatial response within its FOV. This complicates attempts to measure absolute lunar radiance directly, as is done for the ERB parameters.

When the CERES telescope is oriented to view the moon, the lunar radiance fills only 10% of the PSF. Such extreme under-filling of the CERES FOV and lack of an accurate known point spread function (PSF) shape, $P(\theta,\phi)$, adds complications to any attempt to derive lunar radiance from a CERES raster scan across the moon.

It will be appreciated that the moon has an average reflectivity, or albedo of the entire lunar surface, which is believed to remain constant at a level better than $10^{-8}$ per decade. Monthly views of the moon, thus, allow space based photodiode gains to be adjusted, yielding good stability to earth observation measurements. An accurate figure of broadband lunar albedo, however, has never been measured from space. This is because the photodiodes are narrowband detectors and cannot be used to estimate broadband albedo with high accuracy.

Also described in the aforementioned application is a system and method for mapping the PSF shapes, $P(\theta,\phi)$, of the CERES instruments, when performing raster scans of the moon; and using the data to measure the moon's radiant output.

Figure 1A:
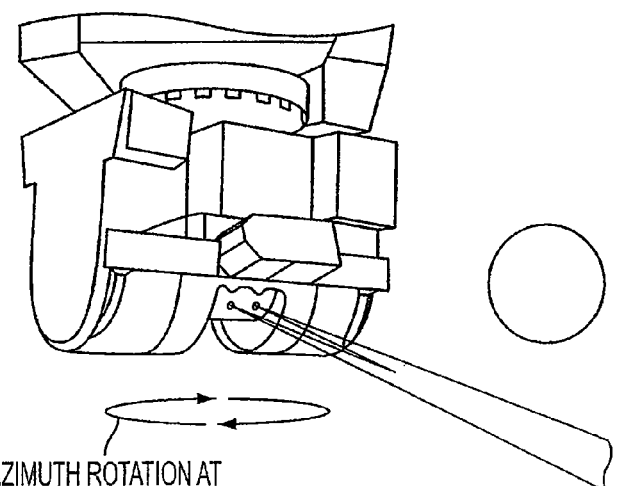
FIG. 1a is a perspective view of a radiometer orbiting the Earth having azimuth and elevation scanning capability, in which the exemplary radiometer is the Clouds and the Earth's Radiant Energy System (CERES).

For purposes of mapping the PSF shapes, $P(\theta,\phi)$, the CERES instruments perform regular raster scans of the moon. The elevation scan head of the CERES instruments is held fixed, while the azimuth of the instruments are rotated back and forth. In this manner, the moon zigzags through the telescope's FOV, as shown in FIG. 1a.

The inventor derives Eqn. 1 as a representation of an integral of the CERES lunar raster scan data over all angular space:

$$F_m = \int_0^{2\pi} V_m(\theta^m, \phi^m) d\Omega \quad (1)$$

where $V_m$ is the detector output from the raster scan data of the moon, $\theta,\phi$ are elevation and azimuth angles, respectively, and $F_m$ represents the integral of the raster scan data of the detector over the angular space.

When the integration of Eqn. 1 is performed on the CERES detector output during a lunar raster scan, the result is the radiometric gain G multiplied by the disk integrated filtered radiance from the moon (as in Eqn. 2, below).

$$F_m = G \int_0^{2\pi} M(\theta, \phi) d\Omega \quad (2)$$

where $M(\theta,\phi)$ is the filtered lunar radiance.

If $R_{eq}$ and $R_{pol}$ are the equatorial and polar radii of the moon (1738.14 km and 1735.97 km), respectively, and $D_{sm}$ is the distance between the satellite and the moon, then the equation below provides the angular extent of the moon, as follows:

$$\Delta\Omega_m = 2\pi\left(1 - \left(1 - \frac{R_{eq}R_{pol}}{D_{sm}^2}\right)^{\frac{1}{2}}\right) \quad (3)$$

Equation 3 may be used to provide the mean filtered radiance K leaving the lunar disk, as follows:

$$K = \frac{F_m}{G \times \Delta\Omega_m} \quad (4)$$

Note that the angular size of the moon is taken outside of the integral in Equation 1 and used in Equation 4, by assuming little, or no change in the CERES satellite to moon distance in the time of the measurement.

Next, a filtering factor, $f_i$, may be defined using the spectral response for a particular scene, i, (for example, the Earth, or moon) as follows:

$$f_i = \frac{\int_0^{200} r(\lambda) L^i(\lambda) d\lambda}{\int_0^{200} L^i(\lambda) d(\lambda)} \quad (5)$$

where $r(\lambda)$ is the spectral response of a CERES channel that provides the fraction of incident radiance at a wavelength $\lambda$, which is converted into heat energy within the detector, and is integrated between 0 and 200 microns, and $L^i(\lambda)$ is the radiance from the particular scene, i, at the wavelength $\lambda$.

It will be appreciated that the numerator of Equation 5 is the filtered radiance of the particular scene, i, obtained from the CERES channel, i.e., the integral of the reflected lunar spectrum and the CERES instrument spectral response. This may also be expressed as the value K in Equation 4. The denominator of Equation 5 is the integral of the reflected lunar spectrum across all wavelengths.

As described in the aforementioned US Application, the average radiance from a celestial body (for example, the moon) is measured by raster scanning the celestial body using a pre-calibrated instrument. Thus, the radiance from the moon, $L^{lun}$, is measured across all the wavelengths, providing the denominator of Equation 5. Thus, $L^{lun}$ may be expressed as:

$$L^i = K/f_i \text{ for a scene } i,$$

or $$L^{lun} = K/f_{lun} \text{ for a lunar scene.} \quad (5A)$$

The filtering factor, $f_{lun}$, may be estimated using the ROLO model estimates of the lunar spectrum in Equation 5.

Whereas the aforementioned US Application describes measuring the average radiance from a celestial body, by raster scanning the celestial body using a pre-calibrated broadband instrument, the present invention raster scans a celestial body to calibrate a spectrometer, or radiometer, while it is in flight. In addition, the aforementioned US Application describes a broadband radiometer, such as CERES, which has a detector sensitive to all wavelengths, the present invention uses a grating spectrometer, such as CLARREO, which has many detectors, in which each detector is sensitive to a different wavelength.

A distinction is now made between the CERES measurement of broadband radiance in watts per meter squared per steradian and the CLARREO measurement of spectrally resolved radiance at each wavelength $\lambda_k$ of watts per meter squared per steradian per micron. The CERES has only one detector sensitive to all wavelengths by different amounts, because the telescope transmission changes depending on the wavelength of light. For CERES the signal of the detector is hence defined as the gain times the broadband filtered radiance (K in Eqn. 4). This broadband filtered radiance is then defined as the broadband filtered radiance times the filtering factor $f_i$ (Eqn. 5). The CERES broadband measurement, K, therefore, needs to be unfiltered by division with the filtering factor (Eqn. 5A).

CLARREO differs from CERES in that it has multiple detectors in an array, each detector sensitive to a different wavelength $\lambda_k$ rather than all wavelengths. When describing CLARREO detector gain $G_k$, this gain includes both the response of that detector $a_k$ (in volts per watt of radiance absorbed) and the transmission of the CLARREO telescope at $\lambda_k$ (namely $r(\lambda_k)$:

$$G_k = a_k * r(\lambda_k)$$

The signal $V_k$ of the detector is, therefore, the unfiltered radiance $L_k$ at wavelength $\lambda_k$ times the instrument response to that wavelength:

$$V_k = L_k * a_k * r(\lambda_k)$$

Hence in contrast to CERES, for the CLARREO spectrometer the 'unfiltering' is inherently part of the division of the signal from detector k by the gain of that detector:

$$L_k = V_k / G_k$$

The present invention solves the CLARREO 'solar issue', in which there is no current plan on how to build a spectrometer to the required 0.3% absolute accuracy and the 0.1%/decade of calibration stability. The raster scan convolution integral technique may be used by the present invention to raster scan the moon using existing technology. At a later date, extra spectrometers may be installed on the International Space Station (ISS) along with a NIST laser bench facility. This will allow NIST traceable measurements of both the sun and moon in the short wave spectrum. An update of the ROLO model based on these data will then allow the NIST standards to be transferred in orbit to CLARREO by scanning the moon.

The USGS Robotic Lunar Observatory (ROLO) has made daily measurements from the Arizona desert of the solar spectral irradiance scattered from the moon. This allowed construction of a database model that gives the spectrally resolved albedo of the moon for all phase/libration angles.

As it is based on measurements made from Earth, the ROLO model has to account for the absorption of the atmosphere above the Arizona desert. For this reason, the ROLO model has excellent stability, but has a low absolute accuracy, estimated to be at the 5-10% level. This absolute accuracy is not sufficient to meet the CLARREO goal of 0.3%.

By using spectrometers to raster scan the moon on the ISS, the ROLO model may be updated using measurements not made through the Earth's atmosphere. The setup of the NIST laser bench facility on the ISS will allow periodic measurements of the ISS spectrometer's spectral response to NIST traceable standards. This will allow the ROLO model's absolute accuracy to reach the required 0.3% level.

Figure 1B:
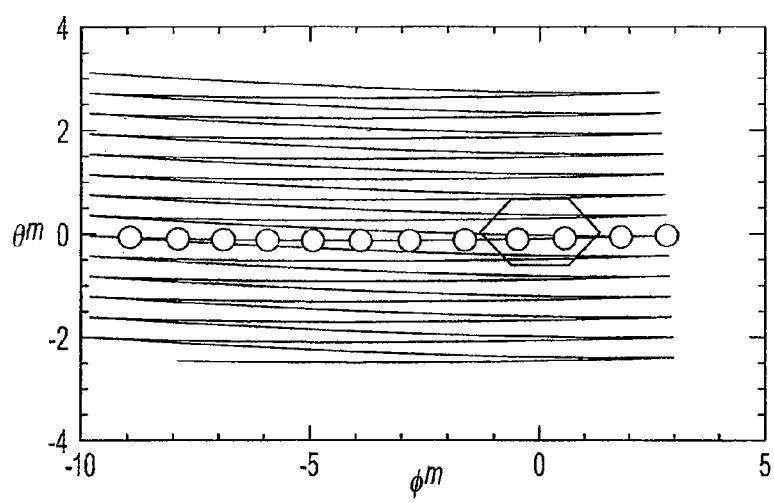
Figure 1C:
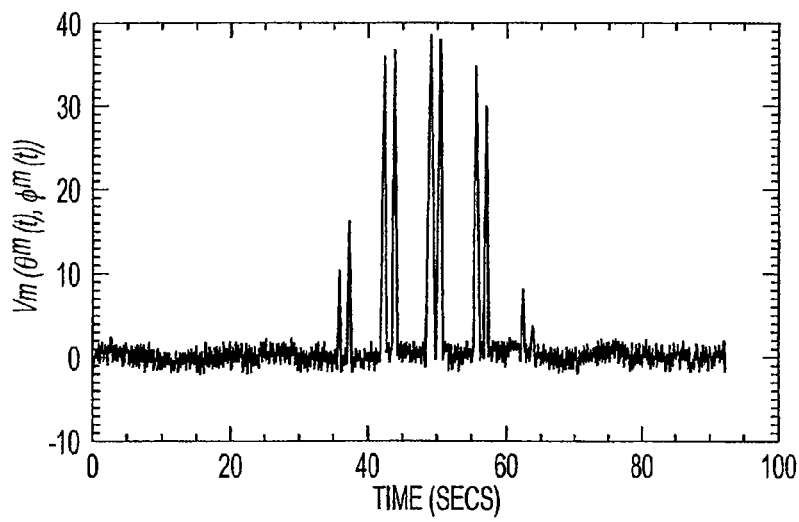
FIG. 1c is an exemplary signal output of a short wave (SW) detector in the CERES instrument during its lunar raster scan shown in FIG. 1b.

These spectrometers may be the same grating spectrometers used on the CLARREO satellite platform. The CLARREO platform includes multiple VIS-NIR instruments, each with three (3) telescopes and grating spectrometers that cover the 320-640 nm, 600-1200 nm and 1150-2300 nm spectral regions. These instruments have both elevation and azimuth gimbals (similar to the CERES instruments) that enable them to view the moon on any orbit. The gimbals are designed so that each instrument may raster scan the moon by rotating in azimuth at a fixed elevation (as shown in FIG. 1a). The scan pattern on the moon may have a pattern, for example, as shown in FIG. 1b. the signal $V_k$ of detector k (and hence wavelength $\lambda_k$) in the grating array may have a form, for example, similar to FIG. 1c.

With $R_{eq}$ and $R_{pol}$ being the equatorial and polar radii of the moon, respectively, and $D_{sb}(t)$ being the distance between the satellite (for example CLARREO) and the moon, the raster scan convolution integral may be used to determine the detector output at each wavelength k. The raster scan convolution integral, $F_k$, is shown as Equation 6 below:

$$F_k = \int_0^{2\pi} \left[ \frac{V_k(\theta(t), \phi(t))}{\Delta\Omega(t)\cos\theta(t)} \right] d\Omega \quad (6)$$

where $$\Delta\Omega(t) = 2\pi \left( 1 - \sqrt{1 - \frac{R_{eq}R_{pol}}{D_{sb}^2(t)}} \right) \text{ and}$$

$V_k$ is the signal from detector k, at wavelength $\lambda_k$, which varies in time, as a function of the elevation and azimuth angles to the moon with respect to the satellite.

It has been shown that the result $F_k$ is the product of the instrument gain and the disc integrated average lunar radiance, as follows:

$$F_k = G_k L_k^{lun} \quad (7)$$

where $G_k$ is the instrument gain at wavelength $\lambda_k$, and $L_k^{lun}$ is the average lunar radiance at wavelength $\lambda_k$.

A method of the present invention provides that a spectrometer, of present day technology, such as the grating spectrometer that is planned for the CLARREO satellite platform, be placed in orbit around the Earth. Once in Earth orbit, the grating spectrometer may also regularly raster scan the moon. After computing the raster scan convolution integral, $F_k$, in Equation 6, the instrument gain at each wavelength, $\lambda_k$ may be determined using the equation below:

$$G_k^{Ed1} = \frac{F_k}{L_k^{ROLO}} \quad (8)$$

where $G_k^{Ed1}$ is the Edition 1 release of the gain of the orbiting spectrometer, at wavelength $\lambda_k$, (such as the CLARREO spectrometer), and
$L_k^{ROLO}$ is the existing radiance of the moon as determined by the ROLO model from the Arizona dessert.

The Edition 1 release of the gain of the grating spectrometer, however, is only as accurate as the known accuracy of the ROLO model, which is approximately 5%. The ROLO model, however, has the required calibration stability per decade of 0.1%. This advantageously allows trending analysis to be performed immediately.

Using the Edition 1 release of the gain of the grating spectrometer, the albedo radiance of the Earth may be determined with the following equation:

$$A_k^{Ed1} = \frac{V_k}{G_k^{Ed1}} \quad (9)$$

where $V_k$ is the signal obtained from detector k operating at wavelength $\lambda_k$, on a scene of the Earth,
$G_k^{Ed1}$ is the Edition 1 release of the gain of the orbiting spectrometer, at wavelength $\lambda_k$, and
$A_k^{Ed1}$ is the albdeo radiance of the Earth at the Edition 1 absolute accuracy.

The albedo radiance of the Earth has the same accuracy as the ROLO model of approximately 5% and a calibration stability of 0.1% per decade.

In the near future (whether before, or after the CLARREO launch is not important), two similar grating spectrometers are installed in the International Space Station (ISS). One grating spectrometer is for raster scanning the sun on each orbit, and the other grating spectrometer is for raster scanning the moon. In addition, both of these spectrometers are accompanied to the ISS by a NIST traceable laser bench facility.

Figure 2A:
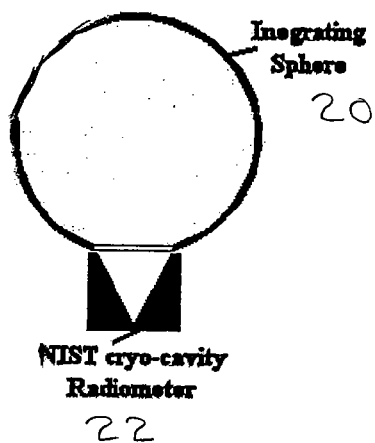
FIG. 2a is a functional diagram of an integrating sphere being calibrated by a National Institute Standards and Tests (NIST) cryo-cavity.
Figure 2B:
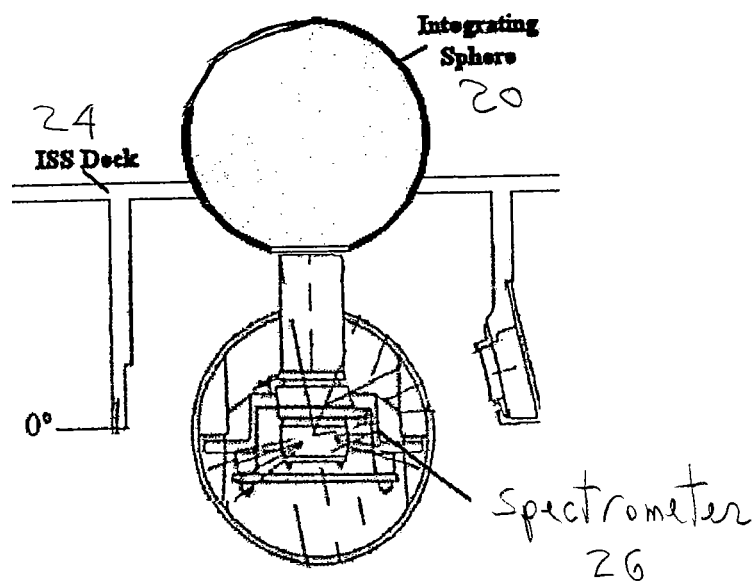
FIG. 2b is a functional diagram of a spectrometer located on the International Space Station (ISS), along with the integrating sphere shown in FIG. 2a, in accordance with an embodiment of the present invention.

Referring now to FIGS. 2a and 2b, there is shown the ISS deck 24 including an integrating sphere 20, a NIST cryo-cavity radiometer 22 and a spectrometer 26, such as a CLARREO instrument.

While on board the ISS, the NIST cryo-cavity radiometer is used to determine the output of integrating sphere 20 to an absolute accuracy of 0.3%, or better. This set up, in turn, allows periodic measurements of the spectral response of each grating spectrometer 26 to NIST traceable standards. The present invention, thus, contemplates that the data from the lunar grating spectrometer 26 in ISS 24 be used to update the USGS ROLO model and give it true NIST traceability.

Since the $F_k$ measured by the ROLO instrument ($F_k$ ROLO) is equal to the $F_k$ measured by the ISS lunar spectrometer ($F_k$ ISS), the ROLO model may be updated to provide a true ($L_k^{ROLO2}$) model. Using the updated, true ROLO model, an accurate Edition 2 gain of the previously orbited CLARREO instrument may be obtained, as follows:

$$G_k^{Ed2} = \frac{F_k}{L_k^{ROLO2}} \quad (10)$$

where $G_k^{Ed2}$ is the newly calculated Edition 2 release of the gain of the previously orbited CLARREO spectrometer, at wavelength $\lambda_k$, and
$L_k^{ROLO2}$ is the updated Edition 2 ROLO model from the Arizona dessert.

After obtaining the newly calculated Edition 2 gain of the CLARREO instrument, the present invention contemplates re-computing the albedo radiance of the Earth using the following equation:

$$A_k^{Ed2} = \frac{V_k}{G_k^{Ed2}} \quad (11)$$

where $V_k$ is a previously obtained signal from detector k operating at wavelength $\lambda_k$, on a scene of the Earth using the previously orbited CLARREO instrument,
$G_k^{Ed2}$ is the Edition 2 release of the gain of the previously orbited CLARREO instrument, at wavelength $\lambda_k$, and
$A_k^{Ed2}$ is the re-computed albedo radiance of the Earth at the Edition 2 absolute accuracy.

The albedo radiance of the Earth obtained from Equation 11 now has an absolute accuracy of 0.3% and a calibration stability of 0.1% per decade. This is the desired result.

Once the ROLO model is updated, it may be usable for all instruments (such as CLARREO) in the coming decades. It may also be advantageous to maintain the ISS solar spectrometer, however, to continue NIST traceable monitoring of the incoming solar spectrum.

The resulting NIST traceable ROLO model enables in-flight calibration of all instruments, past and present, that ever viewed the moon (such as GOES, MODIS, AVHRR, GERB, SEVIRI and MTSAT). The extra grating lunar spectrometer on the ISS may also be used for polar orbiting satellites to perform extra cross calibration.

It may also be prudent to place a thermal spectrometer on the ISS to characterize the moon's thermal emissions and add those to the ROLO model. This will aid in unifying past thermal measurements from CERES.

Figure 3:
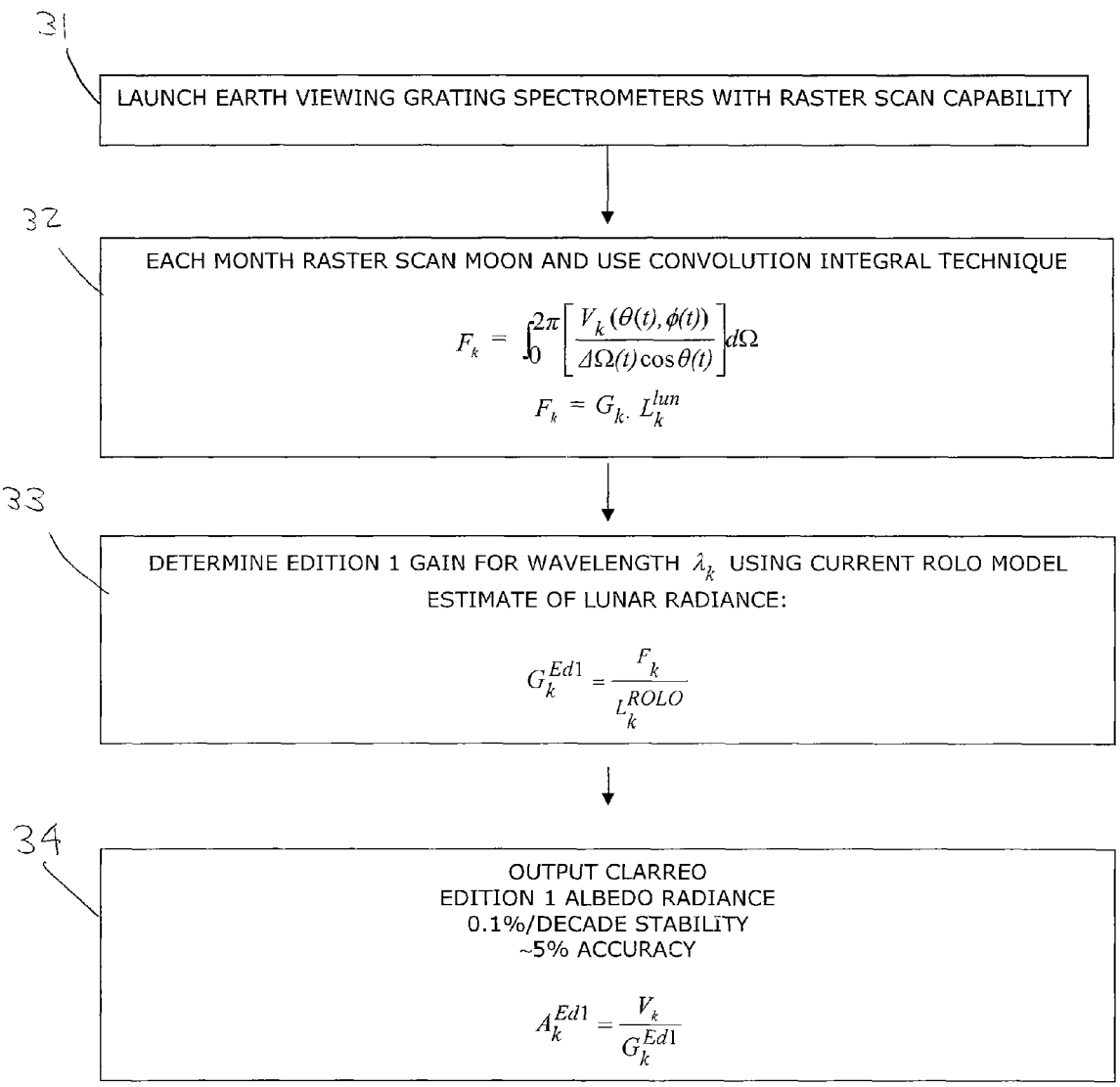
FIG. 3 is a method of determining Edition 1 (low accuracy) gain, at a specific wavelength, k, of an exemplary radiometer (for example, a CLARREO instrument) using an existing ROLO model (low accuracy) estimate of lunar radiance, in accordance with an embodiment of the present invention. The albedo radiance of the Earth is then obtained at a low accuracy.
Figure 4:
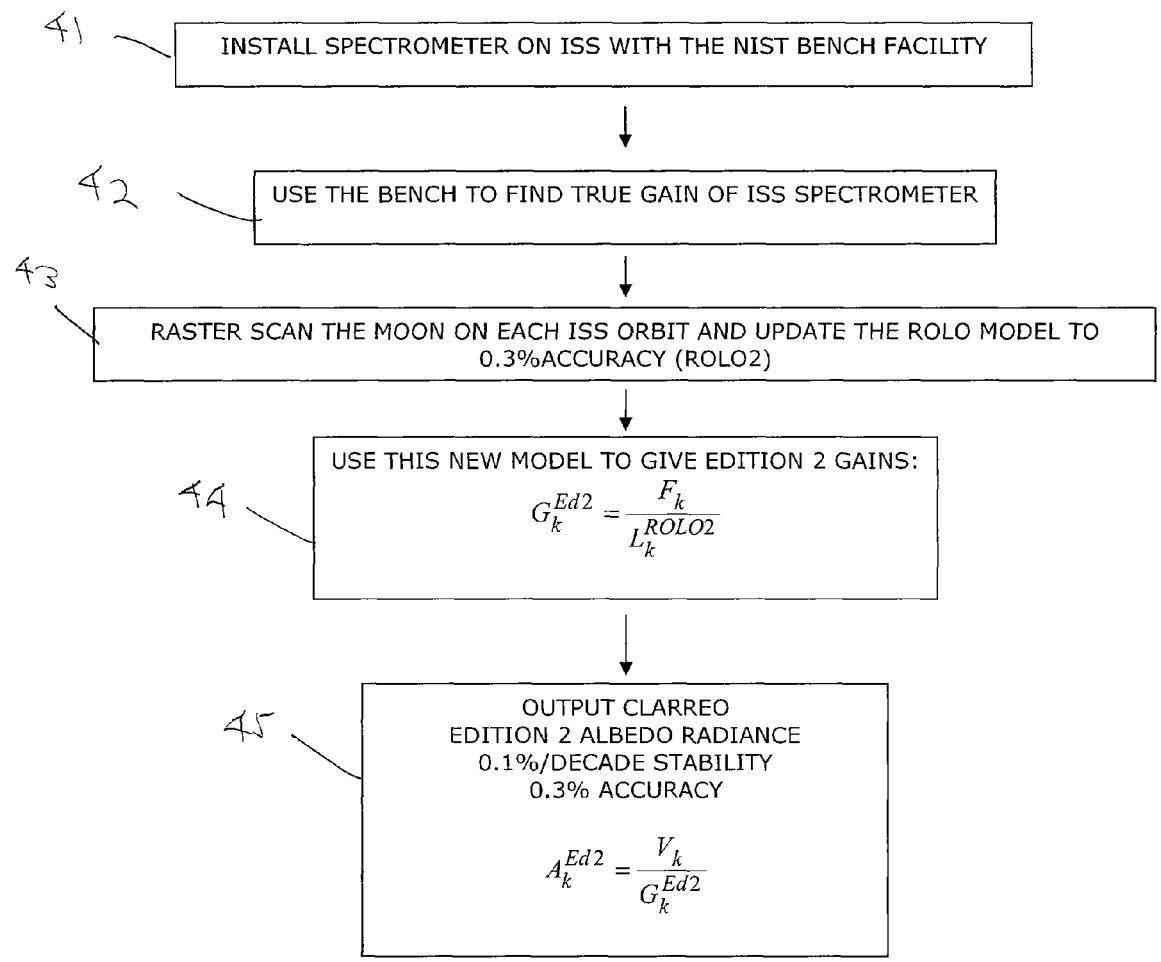
FIG. 4 is a method of installing a spectrometer on the ISS with a NIST traceable, bench facility in order to determine an Edition 2 (high accuracy) gain, at a specific wavelength, k, of an exemplary radiometer (for example, a CLARREO instrument), in order to recalibrate the ROLO model estimate of lunar radiance, in accordance with an embodiment of the present invention. The albedo radiance of the Earth is then recalculated to a high accuracy and new albedo radiance of the Earth is determined at the same high accuracy.

Referring now to FIGS. 3 and 4, flow diagrams are presented to explain a process of the present invention, in which the raster scan convolution integral is used in determining gain of a grating spectrometer, first using a ROLO Edition 1 model (low accuracy) and then updating the model to a ROLO Edition 2 accuracy (high accuracy). In step 31, the method of the present invention launches an Earth viewing grating spectrometer (such as a CLARREO instrument) and raster scans the moon on a periodic basis. Step 32 uses the convolution integral technique to compute $F_k$ (Equation 6). Using an existing ROLO model, obtained from ROLO observations of the moon in the Arizona desert, the Edition 1 gain of the orbited instrument is computed using Equation 8, thereby obtaining $G_k^{Ed1}$ which is of low accuracy. Next, step 34 measures an Earth scene, $V_k$, and computes the albedo radiance of that scene using Equation 9. The albedo radiance of that Earth scene is also of low accuracy.

Referring next to step 41 in FIG. 4, another spectrometer (for example, a CLARREO instrument) is installed on the ISS for raster scanning the moon. A NIST traceable bench facility is also installed on the ISS. Step 42 uses the bench facility to find the true gain of the ISS lunar spectrometer. Step 43 then raster scans the moon and updates the ROLO model to the required high accuracy, thereby providing $L_k^{ROLO2}$. Step 44 is then used to obtain the new gain for the previously orbited CLARREO instrument (Equation 10). Finally, step 45 re-computes the albedo radiance of the Earth scene using the Edition 2 gain computed in step 44 (Equation 11). This provides the updated absolute accuracy of 0.3%.

Figure 5:
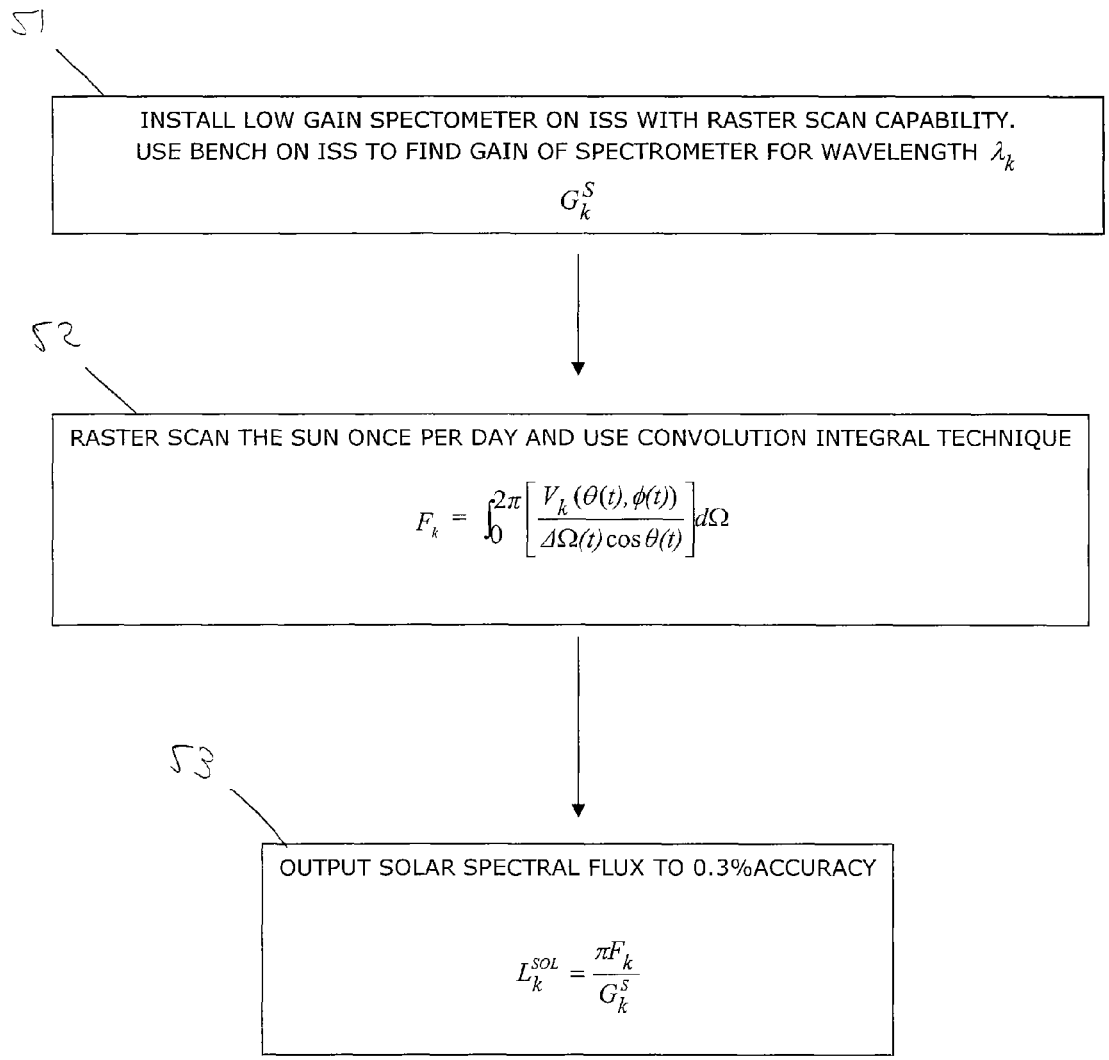
FIG. 5 is a method of installing a spectrometer (for example, another CLARREO instrument) on the ISS with the NIST traceable, bench facility, and calibrate the instrument to a high level of accuracy, at a specific wavelength, k. The instrument is then used to determine the radiance of the sun, at the same high level of accuracy, in accordance with an embodiment of the present invention.

Referring now to FIG. 5, there is shown another method for determining solar spectral flux (or radiance) of the sun using the convolution integral. In step 51, the method installs another spectrometer on the ISS having raster scanning capability of the sun. The bench facility on the ISS is used to find the true gain of the solar spectrometer, at wavelength $\lambda_k$. Step 52 raster scans the sun once per day and uses the convolution integral to obtain $F_k$. Finally, step 53 computes the solar spectral flux (or radiance) to the 0.3% high accuracy required. The computed solar spectral flux may be used to continue the NIST traceable monitoring of the incoming solar spectrum over a long time duration.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for calibrating a spectrometer, while orbiting a celestial body, comprising the steps of:
   (a) obtaining an estimate of radiance emanating from the celestial body;
   (b) raster scanning the celestial body using the spectrometer;
   (c) measuring filtered radiance of the celestial body based on step (b); and
   (d) determining gain of the spectrometer using steps (a) and (c);
   wherein a calibrated spectrometer is based on the determined gain of step (d).

2. The method of claim 1 including the step of:
   (e) raster scanning another celestial body to determine the albedo radiance of the other celestial body, after determining gain of the spectrometer in step (d).

3. The method of claim 2 wherein
the celestial body is the moon and the other celestial body is the Earth.

4. The method of claim 1 wherein
obtaining the estimate of radiance in step (a) results from an Earth based spectrometer used for estimating the radiance emanating from the celestial body.

5. The method of claim 1 wherein
measuring the filtered radiance of the celestial body in step (c) is based on the following equation:

$$F_k = \int_0^{2\pi} \left[ \frac{V_k(\theta(t), \phi(t))}{\Delta\Omega(t)\cos\theta(t)} \right] d\Omega$$

where $$\Delta\Omega(t) = 2\pi \left( 1 - \sqrt{1 - \frac{R_{eq}R_{pol}}{D_{sb}^2(t)}} \right) \text{ and}$$

$V_k$ is the signal from detector k, at wavelength $\lambda_k$, which varies in time, as a function of elevation and azimuth angles to the celestial body with respect to the satellite, $R_{eq}$ and $R_{pol}$ is the equatorial and polar radii of the celestial body, respectively, and $D_{sb}(t)$ is the distance between the satellite and the celestial body.

6. The method of claim 5 wherein
determining gain of the spectrometer in step (d) is based on the following equation:

$$G_k^{Ed1} = \frac{F_k}{L_k^{BODY}}$$

where $G_k^{Ed1}$ is an Edition 1 release of the gain of the spectrometer, at wavelength $\lambda_k$, and $L_k^{BODY}$ is a known radiance of the celestial body, as determined by another spectrometer.

7. The method of claim 6 including the step of:
(e) raster scanning the Earth to determine the albedo radiance of the Earth, after determining gain of the spectrometer in step (d); and
determining the albedo radiance of the Earth includes the following equation:

$$A_k^{Ed1} = \frac{V_k}{G_k^{Ed1}}$$

where $V_k$ is a signal obtained from detector k of the spectrometer, while operating at wavelength $\lambda_k$, on a scene of the Earth, $G_k^{Ed1}$ is the Edition 1 release of the gain of the spectrometer, at wavelength $\lambda_k$, and $A_k^{Ed1}$ is the Edition 1 albedo radiance of the Earth.

8. The method of claim 7 including the steps of:
(f) obtaining an improved estimate of radiance emanating from the celestial body;
(g) determining an improved gain of the spectrometer, using the improved estimate in step (f) and the measured filtered radiance in step (c); and (h) determining an improved albedo radiance of the Earth based on the following equation:

$$A_k^{Ed2} = \frac{V_k}{G_k^{Ed2}}$$

where $V_k$ is the same signal obtained in step (e),
$G_k^{Ed2}$ is an improved Edition 2 release of the gain of the spectrometer, at wavelength $\lambda_k$, and
$A_k^{Ed2}$ is a re-computed Edition 2 albedo radiance of the Earth at an improved accuracy.

9. A method of determining albedo radiance of the Earth comprising the steps of:
(a) obtaining an estimate of radiance emanating from the moon using an Earth-based spectrometer;
(b) raster scanning the moon using an orbiting spectrometer;
(c) measuring filtered radiance of the moon based on step (b); and
(d) determining gain of the orbiting spectrometer using steps (a) and (c); and
(e) estimating the albedo radiance of the Earth using the orbiting spectrometer and the gain determined in step (d).

10. The method of claim 9 wherein
step (a) includes using the Earth-based spectrometer having an absolute accuracy of approximately 5%;
step (d) includes determining the gain of the orbiting spectrometer to an absolute accuracy of approximately 5%; and
step (e) includes estimating the albedo radiance of the Earth to an absolute accuracy of approximately 5%.

11. The method of claim 10 including the steps of:
(f) installing another orbiting spectrometer in space to raster scan the moon;
(g) installing an integrating sphere in space to determine gain of the other orbiting spectrometer;
(h) updating the gain of the Earth-based spectrometer by raster scanning the moon using the other orbiting spectrometer; and
(i) re-estimating the albedo radiance of the Earth initially estimated in step (e).

12. The method of claim 11 wherein
step (h) includes updating the gain of the Earth-based spectrometer to an absolute accuracy of at least 0.3%; and
step (i) includes re-estimating the albedo radiance of the Earth to an absolute accuracy of at least 0.3%.

13. The method of claim 11 wherein
installing another orbiting spectrometer and an integrating sphere in space includes installing both on the International Space Station (ISS).

14. The method of claim 11 including the steps of:
(j) installing yet another orbiting spectrometer in space to raster scan the sun;
(k) determining gain of the yet other orbiting spectrometer using the integrating sphere;
(l) raster scanning the sun using the yet other orbiting spectrometer to obtain an estimate of filtered radiance emanating from the sun; and
(m) determining the albedo radiance of the Earth based on steps (l) and (k).

15. The method of claim 9 wherein
step (c) includes using a convolution integral to obtain the filtered radiance of the moon.

16. A method of improving accuracy of measured albedo radiance of the Earth comprising the steps of:
(a) launching a first spectrometer to raster scan the moon;
(b) using a convolution integral to determine the lunar albedo, and determining gain of the first spectrometer to a low accuracy;
(c) measuring the albedo radiance of the Earth to a low accuracy using the first spectrometer;
(d) launching a second spectrometer and an integrating sphere;
(e) using the integrating sphere to determine gain of the second spectrometer to a high accuracy;
(f) raster scanning the moon to determine the lunar albedo and re-calculate gain of the first spectrometer to a high accuracy; and
(g) updating the measured albedo radiance of the Earth in step (c) to the high accuracy.

* * * * *